Jan. 5, 1954 D. J. TYERMAN 2,664,644
TOE-IN CHANGE INDICATOR FOR AUTOMOBILES
Filed Jan. 26, 1942 3 Sheets-Sheet 1

INVENTOR.
David J. Tyerman.
BY
Albert J. Fihe
ATTORNEY.

Jan. 5, 1954   D. J. TYERMAN   2,664,644
TOE-IN CHANGE INDICATOR FOR AUTOMOBILES
Filed Jan. 26, 1942   3 Sheets-Sheet 2
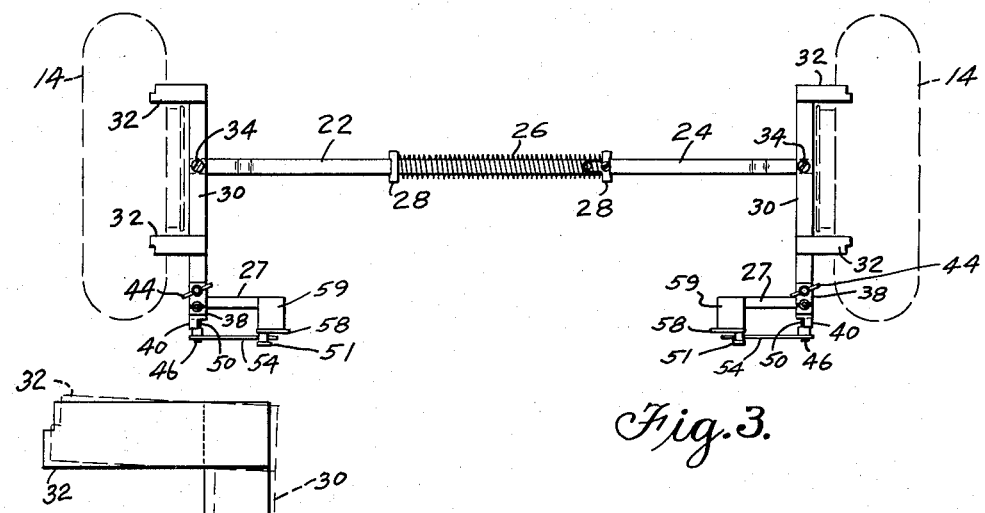
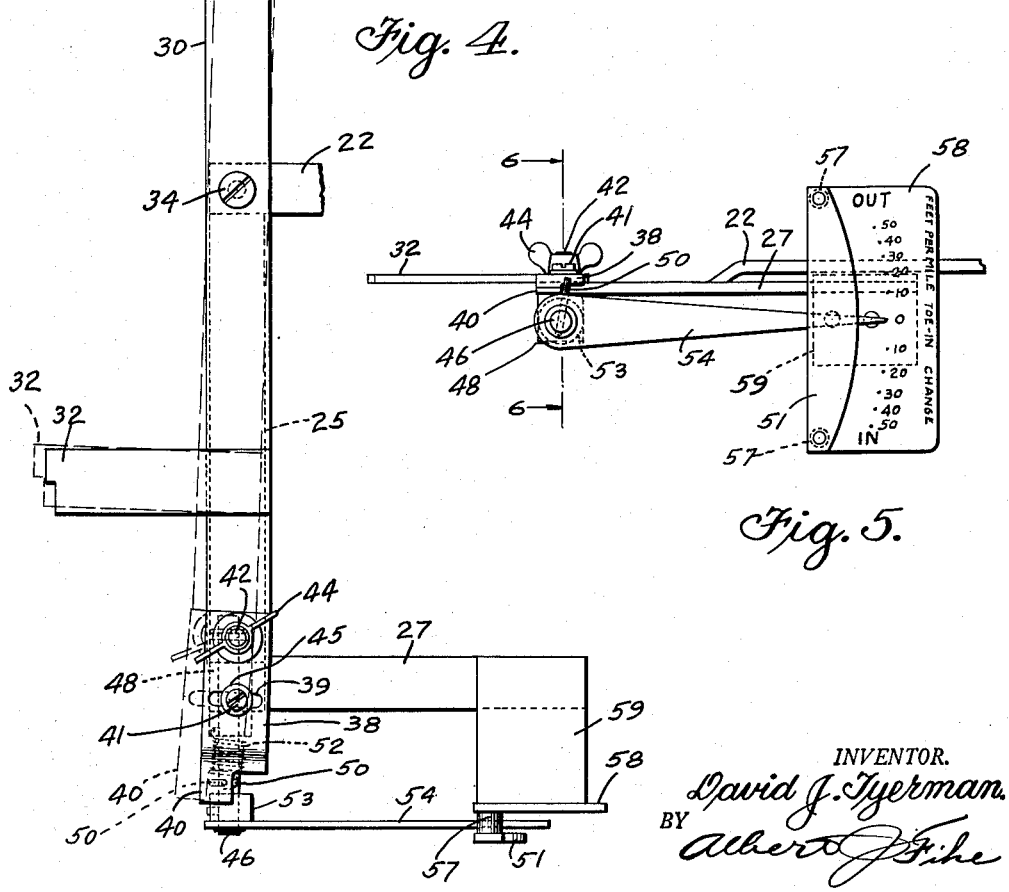
INVENTOR.
David J. Tyerman
BY
Albert J. Fike
ATTORNEY.

Jan. 5, 1954  D. J. TYERMAN  2,664,644
TOE-IN CHANGE INDICATOR FOR AUTOMOBILES
Filed Jan. 26, 1942  3 Sheets-Sheet 3
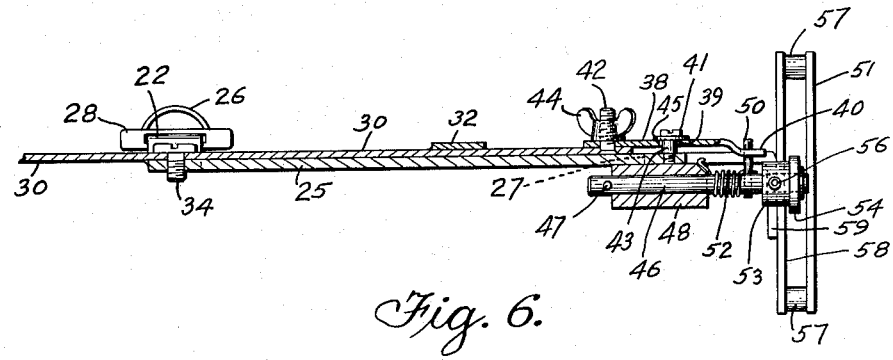
Fig. 6.
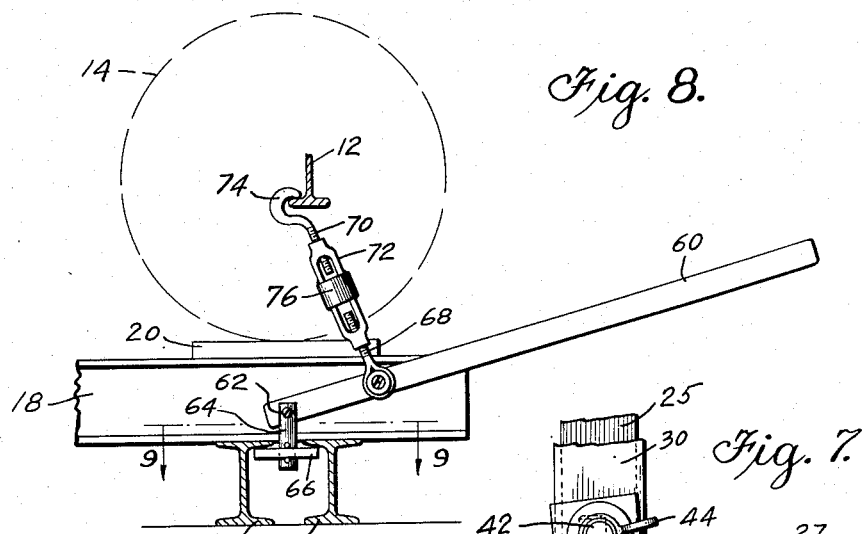
Fig. 8.
Fig. 7.
Fig. 9.
INVENTOR.
David J. Tyerman.
BY
Albert J. Fike
ATTORNEY.

Patented Jan. 5, 1954

2,664,644

UNITED STATES PATENT OFFICE 2,664,644

TOE-IN CHANGE INDICATOR FOR AUTOMOBILES

David J. Tyerman, Burbank, Calif.

Application January 26, 1952, Serial No. 268,451

2 Claims. (Cl. 33—203.2)

This invention relates to a toe-in change indicator for automobiles, and this application comprises a continuation in part and represents quite a number of improvements over my previously filed application for patent entitled "Wheel Toe-In Change Indicator," Serial No. 195,321, filed November 13, 1950.

One of the principal objects of this invention is to provide a toe-in change indicator which will be more efficient, and which will give more accurate readings than my earlier device, and which will consequently be easier of operation and also will provide better service. This invention relates solely to cars having what is known as "Knee-action" front wheel suspension.

As mentioned in my earlier application for patent, one of the important objects of this invention is to provide an indicator which, when placed between the front wheels of an automotive vehicle, will accurately determine and indicate any change of toe-in relationship between the wheels when the load upon the vehicle, and particularly upon the front wheels thereof, is varied.

It has been found that, in many automobiles, a change in load, such as the number of passengers, particularly in the front seat, will oftentimes cause considerable variation in the parallelism of the front wheels and if this parallelism, namely, toe-in, is changed, driving of the car under such conditions will cause undue wear on the tires.

Increase of the load in a car will inevitably cause a variation in the alignment and relationship between the tie-rods, steering arms, and other portions of the front end suspension system, and unless these parts move in the proper relationship, change in toe-in or toe-out of the wheels will occur with increasing loads, inevitably causing damage to the tires. Change in load obviously causes a change in the elevation of the car frame and this also occurs when the brakes are applied to any considerable degree. Actual change in toe-in of cars suffering from this difficulty is accordingly caused by change in relative elevation, but if all the parts move in the proper relationship no change in toe-in will take place regardless of change in load or car elevation. Employment of the indicator of this invention will enable a proper adjustment of the related parts, whereby load changes will not affect the directional parallelism of the wheels.

A further important object of the invention resides in the provision of a toe-in change indicator for automobiles which, when applied, and when used in conjunction with a load changing device, ordinarily supplied with the indicator, will immediately and accurately indicate any undesirable variations from the necessary parallel relationship of the wheels when load changes occur. A more sensitive gauge is provided.

Still another important object of the invention resides in the provision of a device of the class described, which, when applied to the wheels to be gauged, can normally be retained in position while desired changes in the tie-rod or steering arm relationship of the vehicle are made whereby the results of any adjustment will be immediately apparent, rendering the completion of the job much easier and consuming correspondingly less time.

Other and further important objects of the invention will be apparent from the disclosures in the accompanying drawings and following specification.

The invention, in a preferred form, is illustrated in the drawings and hereinafter more fully described.

In the drawings:

Figure 3 is a top view of the structure of Figure 2.

Figure 4 is an enlarged detail view of the left hand end of the device shown in Figures 2 and 3 and illustrating the same in two positions.

Figure 5 is a front view of the dial and pointer mechanism comprising the forward end of the structure of Figure 4.

Figure 6 is a partial sectional view taken on the line 6—6 of Figure 5 looking in the direction indicated by the arrows.

Figure 7 is an enlarged detail view of the adjustable end of one of the arms which control the movements of the pointer, showing more detail than that illustrated in Figure 4.

Figure 8 is a side elevation of a preferred form of load changing apparatus used in conjunction with the toe-in change indicator of this invention.

Figure 9 is a sectional view taken on the line 9—9 of Figure 8, looking downwardly.

As shown in the drawings:

Figure 1:
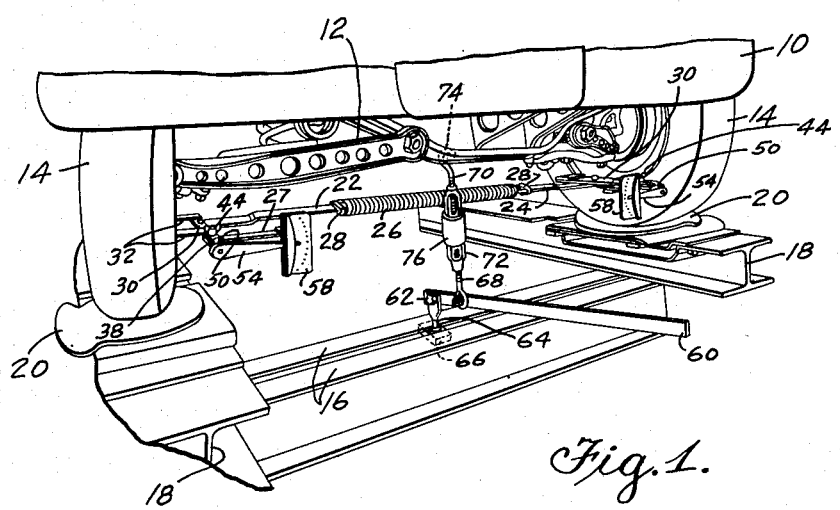
Figure 1 is a perspective view of the improved toe-in change indicator of this invention, showing the same actually in position on an automobile, the front wheel parallelism of which is to be tested; and also showing the load changing apparatus used in conjunction with the indicator.

The reference numeral 10 indicates generally the front bumper of an automobile and the reference numeral 12 indicates generally part of the chassis or frame of a representative modern car. Numeral 14 designates the front wheels thereof, and 16 indicates a supporting cross beam which forms part of a typical automobile alignment rack or similar structure. Side beams 18 are mounted on the bars 16 and pivoted wheel supporting plates 20 are provided as is usual in this type of equipment.

The device itself comprises a pair of bars 22 and 24 arranged for slidable or telescopic relationship, and which bars are normally impelled into an extended position by means of a central spring 26 operating against supports or stops 28 on the bars. These supports, in addition to positioning the ends of the spring 26, are fastened respectively one to each end of the two bars 22 and 24 and an opening in each of the supports 28 is of sufficient size to allow of a slidable relationship between the bars with, however, practically no lost motion or wobble.

Fixed on the end of each bar 22 and 24 is an extension 25, which projects forwardly as best shown in Figure 6, and has affixed to its outer end by welding or the like, a bracket bar 27 which extends in parallel relationship to the bars 22, as illustrated in Figure 4.

Pivotally mounted on the end of each bar 22 and 24 and at the point of junction with the forwardly extending bracket bar 25, is an F-shaped element 30, having bifurcations or projections 32 which in turn are shaped to contact and hold on the rim, tire, or other parts of a wheel 14.

It will be noted that these bifurcations 30—32 are preferably equidistant from the pivot point at the ends of the cross bars 22 and 24. The F-shaped pieces 30—32 are pivotally maintained in position by means of screws 34. The pivot points 34 are at the ends and in the line of force of the spring 26. This distinguishes from the structure of my prior application for patent, wherein the pivot point of the element which contacts the wheels was offset from the longitudinal center of the aligned bars 22 and 24. It has been found that a much more accurate and positive reading is attained in this manner and by this construction.

A stud 42 is fastened in the lower or outer end of each of the F-shaped wheel contacting elements 30—32 and a winged nut 44 is mounted on this stud as best shown in Figures 5 and 6.

This winged nut is for the purpose of maintaining a desired adjusted position of an extension piece 38 of the portion 30 of the F-shaped element 30—32. This extension 38 has an opening in one end thereof which is loosely fitted over the stud 42 and a tightening of the winged nut 44 fixes the extension in a desired adjusted position with relation to its F-shaped supporting structure 30—32. A friction joint may be used in place of the stud and winged nut.

Each of the pieces 38 is provided with a transverse slot 39 which is positioned in approximately the middle thereof and into this slot is fitted a bolt or machine screw 41, and the end of the screw is fastened into a corresponding tapped recess in the end of the element 25 and at its point of intersection with the bracket bar 27. Each screw is surrounded by a sleeve 43, which sleeve fits loosely in the slot 39, and the sleeve is surmounted by a washer 45 which serves to maintain the element 38 in desired relationship to the associated parts, while at the same time allowing of a free movement thereof, limited only by the extent of the slot 39. This combination of screw, sleeve and washer could be replaced by a single mechanical part.

The element 38 has an integral extension 40 which is positioned at one side thereof, and these elements are made in right and left hand construction so as to operate on both sides of the completed device.

A block or bearing 48 is fastened to the under side of the connecting bar 25 and extends in the same direction. This block has a cylindrical opening therein, in which opening is positioned a shaft or pin 46. A pin or the like 47 limits the forward motion of this shaft 46 and that portion thereof which extends beyond the front end of the block 48, is surrounded by a helical spring 52. One end of this spring is fastened to the block 48 and the other end is wrapped around a pin or arm 50 which is fastened into the shaft 46. The outer end of this pin contacts the extending projection 40 of the adjusting plate 38, and the action of the spring 52 is such that the pin 50 is always maintained in contact with the adjacent face of the projection 40. This is preferably rounded for better action.

A bushing 53 is fastened onto the outer end of the shaft 46, this being maintained in desired position by means of a set screw or the like 56, and a pointer 54 is press fitted or otherwise applied onto the outer end of the bushing 53.

The outer end of this pointer 54 moves over a scale or dial 58, which is fastened by means of a bracket 59 to the projecting end of the bracket bar 27.

A guard plate or similar structure 51 is provided for the scale or dial 58 and the pointer 54. The end of the pointer moves in the space between the guard plate 51 and the dial 58. This space being defined by suitable sleeves 57 which surmount rivets holding the guard plate 51 in position on the scale 58.

The dial or scale 58 is graduated to indicate feet per mile toe-in change and it has been found that this is a logarithmic variation, the same being greatest at its immediate point of variation from zero and gradually diminishing as will be evident from the arrangement of the figures on the dial 58 as illustrated in Figure 5. It will also be noted that as the pointer 54 moves downwardly there is indicated a toe-in movement of the wheels with an increase of weight thereon, and a corresponding lowering of the car elevation, while if the pointer moves upwardly from the half-way mark, this indicates a toe-out change with an increase of weight on the front wheels.

When the automobile to be tested is positioned upon the rack 16—18 and the indicator of this invention is placed in position, it will, of course, be necessary to change the load on the front end of the car by some means. This is most readily accomplished by the turn-buckle, link, and lever assembly shown in Figure 8. The lever or handle 60 has a pivot pin 62 provided at its inner end, upon which is mounted a relatively short link 64 with a cross piece 66 rotatably mounted on its lower end. This cross piece is dropped into the space between the beams 16 and then moved transversely as shown in Figures 8 and 9, thereby maintaining that end of the lever in desired position. These parts 64—66 may be modified to accommodate various other types of wheel aligning equipment.

A turn-buckle or the like comprising screw threaded link elements 68 and 70 connected by a left and right hand threaded turn-buckle structure 72 is pivoted onto the handle lever 60, and a hook 74 is provided preferably integral with the link 70. Adjustment of the length of the turn-buckle and link structure is readily accomplished by twirling the element 72, preferably between the hands, by means of a tightly fitted integral sleeve 76.

Figure 2:
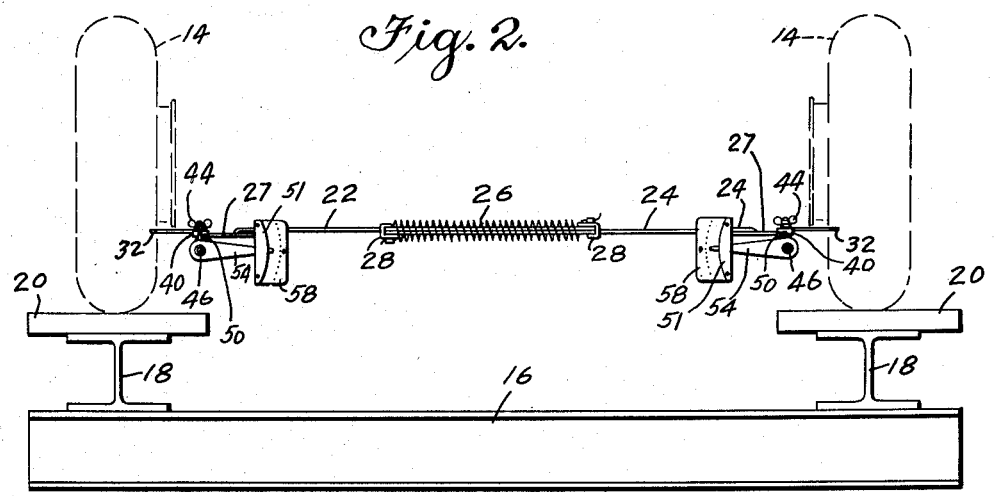
Figure 2 is a front elevation of the device of this invention, showing the same in position between the front wheels of a car and with the pointers on the dials indicating a normal wheel relationship.

When the indicator is in position between the two front wheels as shown in Figures 1, 2 and 3, the load on the front end of the car can be varied by movement of the handle or lever 60, after the handle, turn-buckle, and associated elements have been placed in position.

To make the test, the wheels of the car should be positioned on the free turning radius plates 20, and both the winged nuts 42 should be preliminarily loosened. The wheels should then be set approximately straight ahead. The indicator should then be positioned between the wheels as nearly horizontal as possible and with the gauge plates 58 facing forward.

Load should be applied once or twice by means of the handle 60 in order to allow the indicator to settle into position. After this, a zero adjustment of the pointers 54 should be made for each wheel by moving the element 38 until the pointer settles to zero. The winged nuts 40 should then be tightened.

A test for toe-in is then made by simply pulling down on lever 60. Considering one wheel at a time, if the pointer moves upwardly when the load is applied, that wheel is moving in a toe-out direction as load is increased, and vice-versa. If there is no motion of the pointers from the zero position, this is an indication that the setting is correct and that there will be no toe-in change due to load changes on the car.

For each side of the car and regardless of make or of the particular tie-rod arrangement or design, it will be found that if toe-out of the wheels increases as the load increases, the inner end of the tie-rod must be raised or the outer end must be lowered in order to stop this change. Just the reverse is true if an increase in toe-in is indicated when the load is increased. The only exception to this rule is in cars where the tie-rod mechanism is in front of the knee action structure, in which case the exact opposite applies.

To raise or lower either end of a tie-rod, it is necessary to bend the steering arms. For example, consider a car with a center control arm. If, under test, it shows an increasing toe-out condition, such may be corrected by bending the center control arm up at the end to which the tie-rods are secured. After a preliminary bend, a zero adjustment should again be made prior to the next load change check.

It is evident that herein is provided a toe-in change indicator for vehicle wheels which will most accurately portray any departure from proper and desired relationship of the front wheels due to change in load. The mounting of the F-shaped elements 30—32 with regard to the line of force of the cross bars 22—24 has been found to produce a much more accurate indication of toe-in changes and the new and changed relationship between the adjusting pieces 38 and the portions 30 of the F bars, enables a much more accurate preliminary adjustment of these respective parts, with a subsequent easier setting of the pointer at zero.

Figure 10:
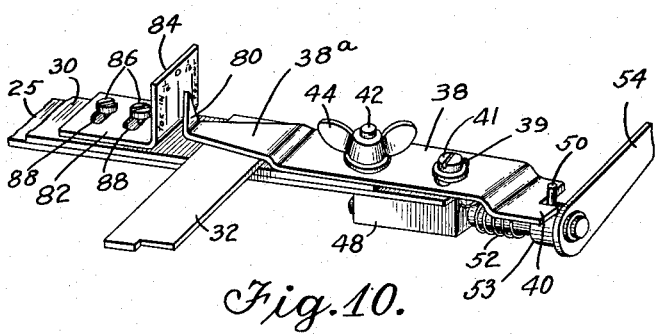
Figure 10 shows a further attachment.

The accuracy of the gauge is greatly increased, first by the pivoting of the F-shaped elements at the ends of the bars 22 and 24, and next by aligning the axis of the rotation of shaft 46 to intersect the axis of the pivot point 34. In this way buckling or distortion of the body of the gauge is eliminated, which distortion would produce a false reading, and the direct action of the adjusting piece 38 on the pin 50 of the pointer shaft 46 will eliminate any undesirable offset, rolling, or twisting of these parts during movement. Furthermore, the employment of only one extension 40 at the end of the adjusting piece 38 for contact with the pin 50 produces a more satisfactory arrangement and one which is not subject to undesirable binding. The spring 52 maintains an operating contact at all times and automatically compensates for wear. In Figure 10 there is shown an extension 38a of the adjusting plate 38, which extension can be integral therewith and which terminates in an upwardly bent pointer 80. This pointer is mounted for juxtaposed relationship with a dial or scale plate 84 forming part of an angular base 82, adjustably mounted on the element 30 by means of set screws or the like 86, positioned in slots 88.

I am aware that many changes may be made and numerous details of construction varied throughout a wide range without departing from the principles of this invention, and I, therefore, do not propose limting the patent granted hereon otherwise than as necessitated by the claims.

I claim as my invention:

1. A toe-in indicator for automobiles comprising: a pair of substantially aligned, relatively slidable bars; each of said bars being provided with stop means; a coil spring mounted on said bars and abutting said stop means to constantly bias said bars apart; each of said bars being provided at its outer end with a bifurcated member pivoted to the end of its associated bar at a point midway of said bifurcated member; the ends of said bifurcated members providing wheel engaging members adapted to engage the wheels of a vehicle in a substantially horizontal plane when said indicator is placed in position between the wheels of a vehicle; each of said bars adjacent its end having a forwardly directed extension fixed thereon; bearing means carried by said extension; a pin journalled in said bearing means having an axis intersecting the pivot axis of its associated bifurcated member; a bracket carried by said extension, a vertically disposed scale carried by said bracket; a pointer mounted on said pin and associated with said scale; a substantially vertically extending arm fixedly carried by said pin; each of said bifurcated members having substantially forwardly directed extensions associated with said bar-carried-extension; adjustable means carried by said bifurcated member extensions and adapted to engage said arm to rotate said pin to move said pointer with respect to said scale on pivotal movement of said bifurcated member.

2. A toe-in indicator for automobiles comprising: a pair of substantially aligned, relatively slidable bars; each of said bars being provided with stop means; a coil spring mounted on said bars and abutting said stop means to constantly bias said bars apart; each of said bars being provided at its outer end with a bifurcated member pivoted to the end of its associated bar at a point midway of said bifurcated member; the ends of said bifurcated members providing wheel engaging members adapted to engage the wheels of a vehicle in a substantially horizontal plane when said indicator is placed in position between the wheels of a vehicle; each of said bars adjacent its end having a forwardly directed extension fixed thereon; bearing means carried by said extension; a pin journalled in said bearing means having an axis intersecting the pivot axis of its associated bifurcated member; a bracket carried by said extension, a vertically disposed scale carried by said bracket; a pointer mounted on said pin and associated with said scale; a substantially vertically extending arm fixedly carried by said pin; each of said bifurcated members having substantially forwardly directed extensions associated with said bar-carried-extension; adjustable means carried by said bifurcated member extensions and adapted to engage said arm to rotate said pin to move said pointer with respect to said scale on pivotal movement of said bifurcated member; and a coil spring engaging said arm constantly biasing said arm into engagement with said adjustable means; said adjustable means having means for securing the same in a fixed position relative to said bifurcated member extension.

DAVID J. TYERMAN.

References Cited in the file of this patent

UNITED STATES PATENTS

| Number | Name | Date |
|---|---|---|
| 1,206,476 | Snyder | Nov. 28, 1916 |
| 1,477,450 | Sandbo | Dec. 11, 1923 |
| 1,761,516 | Bushey | June 3, 1930 |
| 2,256,968 | Wochner | Sept. 23, 1941 |
| 2,469,541 | Bagge et al. | May 10, 1949 |
| 2,509,466 | Leach | May 30, 1950 |
| 2,522,916 | Zeigler | Sept. 19, 1950 |

FOREIGN PATENTS

| Number | Country | Date |
|---|---|---|
| 242,331 | Great Britain | Oct. 30, 1925 |